(12) United States Patent
Khris

(10) Patent No.: US 11,159,675 B2
(45) Date of Patent: Oct. 26, 2021

(54) METHOD FOR TELEPHONIC LINKING OF A COMMUNICATION TERMINAL WITH MULTIPLE NUMBERS

(71) Applicant: ONOFF TELECOM, Paris (FR)

(72) Inventor: Taïg Khris, Paris (FR)

(73) Assignee: ONOFF TELECOM, Paris (FR)

( * ) Notice: Subject to any disclaimer, the term of this patent is extended or adjusted under 35 U.S.C. 154(b) by 0 days.

(21) Appl. No.: 16/645,388

(22) PCT Filed: Sep. 4, 2018

(86) PCT No.: PCT/EP2018/073784
§ 371 (c)(1),
(2) Date: Mar. 6, 2020

(87) PCT Pub. No.: WO2019/052860
PCT Pub. Date: Mar. 21, 2019

(65) Prior Publication Data
US 2020/0296210 A1   Sep. 17, 2020

(30) Foreign Application Priority Data

Sep. 13, 2017 (FR) ...................................... 1758500

(51) Int. Cl.
*H04M 3/42* (2006.01)
*H04W 8/26* (2009.01)

(52) U.S. Cl.
CPC ......... *H04M 3/42306* (2013.01); *H04W 8/26* (2013.01); *H04M 2203/558* (2013.01); *H04M 2207/18* (2013.01)

(58) Field of Classification Search
CPC ....... H04M 3/42306; H04M 2203/558; H04M 2207/18; H04M 3/42102; H04W 8/26; H04W 4/60; H04L 61/1547
See application file for complete search history.

(56) References Cited

U.S. PATENT DOCUMENTS

2006/0205404 A1* 9/2006 Gonen ................... H04W 8/06
455/432.1
2009/0310598 A1* 12/2009 Winbladh ............ H04M 15/50
370/352

(Continued)

FOREIGN PATENT DOCUMENTS

EP          2036319 B1     12/2011

OTHER PUBLICATIONS

Search Report from French Intellectual Property Office on corresponding FR application (FR1758500) dated May 29, 2018.

*Primary Examiner* — Minjung Kim
(74) *Attorney, Agent, or Firm* — Klein, O'Neill & Singh, LLP

(57) ABSTRACT

The subject of the present invention is a method for establishing a telephone connection between a first terminal of a user and a second terminal of a contact, the infrastructures of the first operator and the second operator being connected to a call server the user moreover disposing of a virtual call number, the correspondence between said first physical call number and the virtual call number being recorded in said database of the call server, said method comprising:
 the allocation of at least one technical number to the second physical call number through the call server,
 the recording in the database of the call server of the association between said second physical call number and said technical number,
 when a call or a mini-message is sent to said technical number from the first terminal or to said virtual number from the second terminal, telephonically connecting the first terminal and the second terminal by means of the transmission of the call or the mini-message, by the call server, destined for the first physical call number or, respectively, for the second physical call number.

9 Claims, 2 Drawing Sheets

(56) References Cited

U.S. PATENT DOCUMENTS

| | | | |
|---|---|---|---|
| 2014/0161242 A1* | 6/2014 | Reiher | H04M 1/27485 |
| | | | 379/201.01 |
| 2014/0295898 A1* | 10/2014 | Piotr | H04W 4/14 |
| | | | 455/466 |
| 2015/0358476 A1* | 12/2015 | Flores-Estrada | H04L 65/1046 |
| | | | 370/259 |
| 2015/0381805 A1 | 12/2015 | Guedalia et al. | |
| 2016/0212600 A1* | 7/2016 | Backhaus | H04M 3/42255 |

* cited by examiner

METHOD FOR TELEPHONIC LINKING OF A COMMUNICATION TERMINAL WITH MULTIPLE NUMBERS

TECHNICAL FIELD

Generally speaking, the invention relates to the telecommunications field. In particular, the method according to the invention enables the establishment of a telephone connection between two communication terminals connected to a telecommunication network, for example of GSM (Global System for Mobile Communication, technology also designated 2G), UMTS (Universal Mobile Telecommunications System, technology also designated 3G) or LTE (Long Term Evolution, technology also designated 4G) type.

More specifically, the present invention relates to users having a multiple number, that is to say having recourse to a service, for example via a software application, allowing them to dispose of, for receiving and sending telephone calls or mini-messages by means of their communication terminal, in addition to the physical call number associated with said terminal, or more specifically associated with a SIM card inserted in said terminal, one or more virtual numbers that can be used with the same terminal.

The present invention further makes it possible to establish telephone connections in an optimised manner in terms of cost, whatever the country wherein is found the user.

BACKGROUND

As is known, numerous communication terminals, in particular mobile communication terminals, such as those commonly designated by the term "smartphones", are able to establish communications via a telephone communication network or via a data communication network, notably by means of software applications enabling users to dispose of one or more so-called virtual call numbers, in a transparent manner for third parties.

These software applications making it possible to use several call numbers from a single mobile terminal today require, in order to operate, an internet access.

Indeed, technologies making it possible to resort to a so-called virtual call number are generally based on the establishment of "voice on IP" communications (IP for Internet Protocol), well known to those skilled in the art, by means of a data communication network.

These technologies making it possible, in other words, to benefit from a "multiple" call number from a single communication terminal, thus operate providing that said terminal is connected to a data communication network.

In the remainder of the present document, "multiple number" will designate the fact that a user disposes of both a physical call number, such as the physical number associated with the SIM (Subscriber Identity Module) card engaged in his terminal, and at least one virtual call number conferred by a service independent of the operator disposing of the hardware infrastructure of the telecommunication network to which the user accesses via his SIM card and the physical number that is associated therewith.

There thus exists a need for a method enabling a user disposing of a multiple number to send and to receive telephone calls or messages of SMS (short message service) type from or to a virtual number, including without internet access.

SUMMARY

To this end, the invention relates to a method for establishing a telephone connection between a first terminal of a user, said first terminal having a first physical call number, unique, and a second terminal of a contact, said second terminal having a second physical call number, unique, the first terminal being connected to a telecommunication network via an infrastructure of a first operator and the second terminal being connected to said telecommunication network via an infrastructure of a second operator, the infrastructures of the first operator and the second operator being connected to a call server comprising a database comprising a plurality of technical numbers, the user moreover disposing of a virtual call number distinct from the physical call number, the correspondence between said first physical call number and the virtual call number being recorded in said database of the call server, said method comprising:
- the allocation of at least one technical number to the second physical call number through the call server,
- the recording in the database of the call server of the association between said second physical call number and said technical number,
- when a call or a mini-message is sent to said technical number from the first terminal or to said virtual number from the second terminal, telephonically connecting the first terminal and the second terminal by means of the transmission of the call or mini-message, by the call server, destined for the first physical call number or, respectively, for the second physical call number.

Thanks to the present invention, notably, a user having at least one virtual number associated with a physical call number can send and receive calls or mini-messages in a transparent manner for his contacts, using local call numbers allocated to said contacts and designated "technical numbers".

According to an embodiment, the technical number allocated to the second physical call number corresponds to a local call number of the country wherein the first terminal is located.

Advantageously, the method comprises the detection by the call server of any change of country wherein the first terminal is located and the allocation of a new local technical number to each contact having a second physical call number in the event of change of country.

Advantageously, the first terminal comprising a plurality of contacts associated respectively with a second physical call number, said method comprises the allocation of a technical number to each second physical call number.

Advantageously, a plurality of lists of a plurality of technical numbers corresponding to lists of local numbers for a plurality of respective countries are pre-recorded in a memory of the first terminal.

Advantageously, following the detection, by the call server, of a change of the country wherein the first terminal is located, the method comprises the downloading of a list of a plurality of local technical numbers of the new country wherein the first terminal is located and the allocation of a new local technical number to each contact having a second physical call number.

According to an embodiment, the call server transmits to the first terminal or to the second terminal, corresponding to the destination terminal of the call or the mini-message, the technical number of the second terminal or, respectively, the virtual number of the first terminal, corresponding to the terminal sending the call or the mini-message, as constituting an identification number of the terminal sending the call or the mini-message.

According to an embodiment, the telephone connection comprises:

the reception of an incoming call or mini-message, destined for the virtual number, by the call server, the determination, by interrogation of the database of the call server, of the first physical call number corresponding to said virtual number, the sending, by the call server, of a terminating call or mini-message to said first physical call number, the end to end connection, by the call server, of the incoming call or mini-message and the terminating call or mini-message to telephonically connect the first terminal and the second terminal.

According to an embodiment, the telephone connection comprises:

the reception of an outgoing call or mini-message, destined for the technical number, by the call server, the determination, by interrogation of the database of the call server, of the second physical call number corresponding to said technical number, the sending, by the call server, of a terminating call or mini-message to said second physical call number, the end to end connection, by the call server, of the outgoing call or mini-message and the terminating call or mini-message to telephonically connect the first terminal and the second terminal.

BRIEF DESCRIPTION OF THE DRAWINGS

The invention will be better understood on reading the description that follows, given uniquely as an example, and by referring to the appended drawings among which.

DETAILED DESCRIPTION

It is recalled that the present invention is described hereafter by means of different non-limiting embodiments and is capable of being implemented in alternatives within the reach of those skilled in the art, also targeted by the present invention.

In the remainder of the description, "communication terminal" or "terminal" is taken to mean any electronic device, notably any mobile telephone of "smartphone" type, provided with computing means and data storage means and able to transmit and to receive data via a telephone and/or data communication network.

Figure 1:
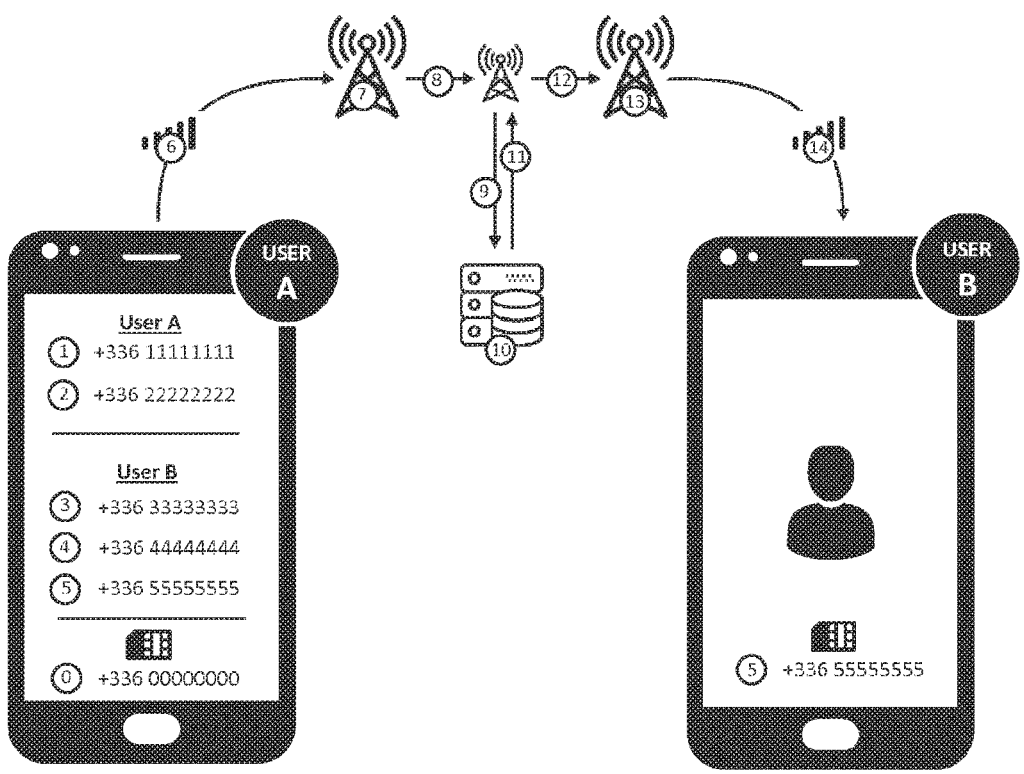
FIG. 1 represents the implementation diagram of the method according to the invention when a user sends a call signal destined for a contact.
Figure 2:
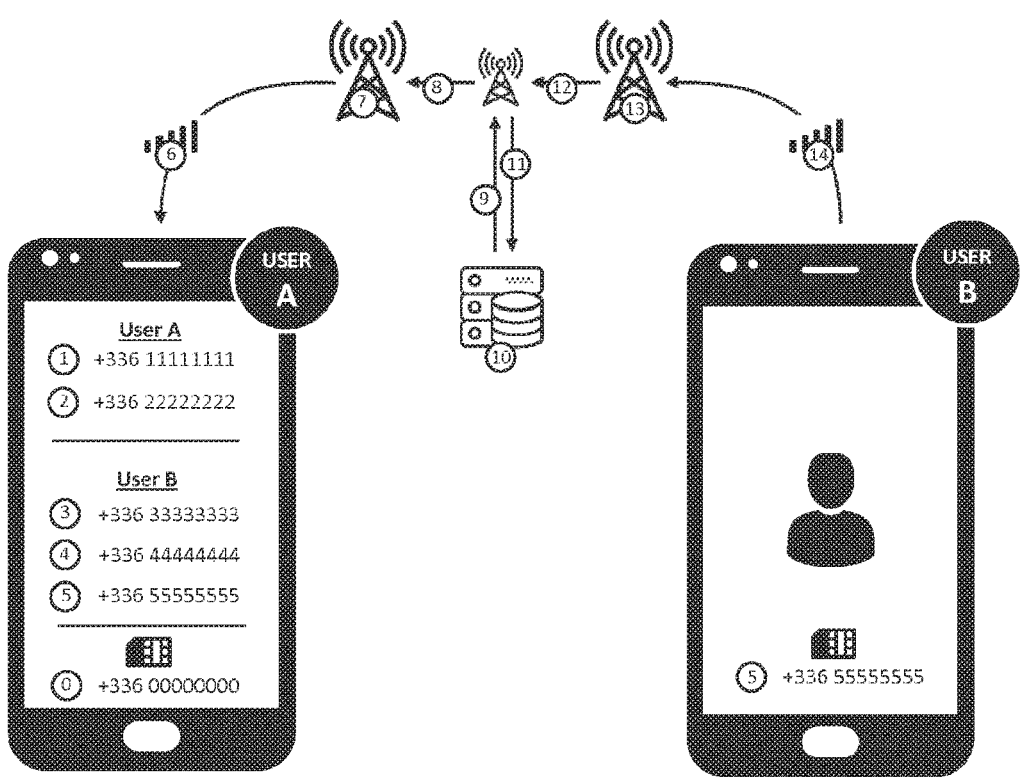
FIG. 2 represents the implementation diagram of the method according to the invention when a user receives a call sent by a contact.

In FIGS. 1 and 2, the communication terminals of the user User A and the contact User B are thus, in particular, smartphones connected to a telephone communication network 6, 7, 8, 12, 13, 14.

It is recalled that a telephone communication network 6, 7, 8, 12, 13, 14 consists of a private or extended communication infrastructure enabling the connection of a plurality of items of communication equipment, such as servers, commutation switches, databases and communication terminals. In a known manner, the communication infrastructure of a telephone communication network forms a wireless and/or wired network. In particular, in the context of the invention, the telephone communication network is preferably of GSM, UMTS or LTE type.

It is also recalled that a data communication network consists of a private or extended communication infrastructure enabling the connection of a plurality of items of communication equipment, such as servers, commutation switches, databases or communication terminals for example. In a known manner, the communication infrastructure of a data communication network forms a wireless and/or wired network. In the context of the invention, the data communication network is notably a network complying with the internet protocol (IP).

The method according to the invention is intended for users having recourse to a multiple number on their communication terminal.

Such a user disposes of a software application having access to a list of contacts saved in a memory of said terminal. Said software application cooperates with a remote call server 10 storing notably, in a database, information relative to all the users, of which the association between their respective physical call number and their virtual number(s).

The software application imports the list of contacts to form a list of contacts of the software application synchronised with the list of contacts of the terminal and downloads a copy of said list of contacts of the software application on the call server 10.

The present invention enables detailed management of the different call numbers used by the user for sending and receiving calls or SMS from any terminal having a physical call number. Generally speaking, said terminal is a mobile communication terminal, in other words a "smartphone", equipped with a SIM card associated with a physical call number.

The present invention makes it possible in particular to carry out this management of the reception or the sending of communications via a virtual number conferred by a service in a transparent manner in terms of user experience, and including without internet access, in other words including without the terminal concerned being connected to a data communication network from the moment that it is connected to a telephone communication network, typically via a SIM card valid with a telephone operator.

To this end, a so-called technical number 4 is allocated to each contact of the list of contacts. This association between each contact, disposing of a physical call number 5, and a technical number 4, is generated via the software application and recorded both at the level of the terminal of the user and the call server 10.

The technical number 4 may just as easily be a mobile, fixed, geographic or premium rate call number. The technical number may even, according to an embodiment, be a simple technical code not corresponding to a call number.

Each technical number 4 is thus linked to a specific contact in the list of contacts of the software application. As indicated previously, the list of contacts of the software application is synchronised with that of the terminal and that of the call server 10.

This synchronisation is preferably automatic via said software application. Alternatively, it may be carried out manually by the user.

According to an embodiment wherein said software application forms a function integrated in the operating system of the terminal, said technical number 4 associated with each contact may be invisible for the user User A.

According to an embodiment, the technical numbers 4 associated with the contacts of the list of contacts of the software application are local call numbers of the country wherein is found the user. Preferably, the software application detects the country wherein is found the user User A and the terminal so as to associate the local technical numbers 4 with the contacts of the list of contacts of the software application.

The software application, potentially via the call server 10, interrogates for example the SIM card of the terminal to know the country wherein is situated the terminal. From that moment, the technical numbers 4 associated with the contacts are adapted to correspond to local call numbers, for example local call numbers of mobile communication terminals. In this way, each contact of the list of contacts is associated with a dedicated technical number 4 that is allocated thereto.

The technical number 4, for each contact, is recorded as a number of said contact, typically as a second call number, beside a main call number, said main number being able to be a physical call number for example, that is to say associated with a communication terminal of the contact via a SIM card.

According to an embodiment wherein the software application constitutes a function of an operating system of the mobile terminal of the user User A, this "second number", in other words the technical number, may be invisible for said user User A.

As an illustration, notably with reference to FIGS. 1 and 2, a user "User A" is thus considered in possession of a mobile terminal with a SIM card associated with the physical call number 0, i.e. +336 00000000, and two virtual numbers 1, 2 conferred by the software application, i.e. +336 11111111 and +336 22222222 for example. If need be, said virtual numbers may be associated with a category, so as to be used in a differentiated manner depending on the context. For example, +336 11111111 may be associated with a "Business" category and +336 22222222 may be associated with a "Family" category.

The user "User A" has a plurality of contacts. If need be, each contact may also be associated with a category, such as "Business", "Family", etc., making it possible to classify said contacts.

One of his contacts, designated "User B" has a terminal with a SIM card associated with the physical call number 5, i.e. +336 55555555, for example classified in a "Business" category. The technical number 4, i.e. +336 44444444, is allocated by the software application to this physical call number 5 of the contact User B.

If need be, the contact User B may also be recorded in the list of contacts with, moreover, a virtual number, i.e. +336 33333333. In this case, a distinct technical number could be associated with this virtual number +336 33333333.

This technical number 4 appears as a second contact number in the list of contacts recorded on the terminal of the user and may be made invisible by the operating system of said terminal if the software application forms part thereof.

Preferably, if the user User A has several virtual numbers associated respectively with a category, as in the present case, and if the contact User B is himself associated with a category, then the technical number 4 of the contact User B is linked, in the software application of the user User A, to the virtual number of the user User A belonging to the same category, and any change of category is automatically synchronised by the software application.

Also preferably, if the user User A manually deletes the technical number of the contact User B in the list of contacts of his terminal, the software application, via the call server 10, detects it and recreates it.

Case of an incoming call destined for the user, sent by a contact:

If the contact User B calls on the physical call number associated with the SIM card of the terminal of the user User A, i.e. +336 00000000, the call is routed by the telecommunication network, via 14, 13, 12, 8, 7, 6, without intervention of the method according to the invention.

On the other hand, with reference to FIG. 1, if the contact User B composes a virtual number of the user User A, for example the virtual number 1 categorised "Business", i.e. +336 11111111, then, in this case, the terminal of the contact User B, via the SIM card of the corresponding terminal, sends a call destined for the virtual number of the user User A. The call is transmitted, via 14, 13, 12, 11, to the call server 10 of the operator owner of the virtual number +336 11111111. The call server 10, belonging to the hardware infrastructure of said owner, knows, because this information is recorded in the database, the association between said virtual number 1, here categorised "Business", and the physical call number of the user.

Said call server 10 consequently routs, via 9, 8, 7, 6, the call destined for the physical call number 0 associated with the SIM card of the user, i.e. +336 00000000.

The call server 10 also disposes of information according to which the contact User B, sender of the call, has as physical call number 5 the physical number associated with the SIM card integrated in the terminal that he uses, i.e. +336 55555555, and that the call is destined for the number +336 11111111 which is a virtual number 1 categorised "Business" of the user User A.

According to an embodiment, the call server 10, to rout the call up to destination and to telephonically connect the contact User B and the user User A, sends a new call, designated "terminating call", to the physical call number 0 of the user User A, i.e. +336 00000000, then end to end connects the call received from the terminal of the contact User B and said terminating call.

According to an embodiment, the call server 10 indicates to the terminal of the user User A the technical number +336 44444444 of the contact User B as calling number. In terms of user experience, from the point of view of the user User A, then everything happens as if he was receiving a conventional telephone call sent by a contact having as call number +336 44444444.

It should be noted that once the allocation of a technical number to a contact is made, from the moment that this allocation is recorded in the list of contacts and saved on the call server 10, the method according to the invention works even in the absence of the software application on the terminal and even in the absence of data communication network to which said terminal would be connected.

Case of an Outgoing Call Sent by the User, Destined for a Contact:

It is here considered that the user User A has the software application installed on his terminal. Said software application disposes of a synchronised copy of the list of contacts of the user.

With reference to FIG. 2, when the user User A sends a call from a virtual number 1, for example categorised "Business", i.e. +336 11111111, with his SIM card associated with the physical call number 0, i.e. +336 00000000, destined for the physical call number 5 of the contact User B, i.e. +336 55555555, or destined for a virtual number 3 of said contact User B, i.e. +336 33333333, the software application makes the SIM card of the user User A send a call to the technical number +336 44444444 allocated to this contact. The call is routed up to the call server 10, via 6, 7, 8, 9. The call server 10, by means of its database, knows the physical call number 5 corresponding to the technical number 4 that has been allocated to it for the user User A. Said call server 10 consequently routs the call up to the contact User B, via 11, 12, 13, 14.

According to an embodiment, when the contact User B is categorised in the list of contacts of the user for example as being a "Business" or "Family" contact, the call server 10 indicates as call number of the caller the virtual number of the user User A corresponding to said category.

According to an embodiment, in the case where the contact is not associated with a category, the call server 10 may indicate that the call is made with a masked number.

When it involves the sending of SMS by the user User A destined for the contact User B, the principle is similar. When the user User A selects the contact User B with a view to sending him a SMS, the software application opens the native application of the terminal making it possible to send SMS and pre-composes the technical number 4 allocated to the contact User B, namely +336 44444444.

For this reason, the SMS sent to the technical number 4, i.e. +336 44444444, is received by the call server 10 belonging to the owner of said technical number 4. Said call server 10 redirects the SMS to the physical call number 5 associated with the SIM card of the terminal of the contact User B, i.e. +336 55555555, preferably by displaying as number of the user sending the SMS one of its virtual numbers, corresponding to the category to which belongs the contact User B in the list of contacts of the user User A.

For the reception of SMS by the user User A, the steps described above apply reciprocally.

As indicated previously, the technical numbers allocated to the contacts are preferably call numbers corresponding to local mobile terminals. "Local" is obviously taken to mean the fact that said call numbers correspond to call numbers of the country wherein is found the terminal of the user.

It has also been described that each contact can be allocated a new technical number when the user changes country. Thus, according to an embodiment, the call server 10 is configured to make available to each user a group of 10,000 technical numbers per country. It is in fact extremely rare that a user has more than 10,000 contacts. The number of technical numbers per country may however be chosen less than or more than this figure of 10,000.

These 10,000 technical numbers may indeed be shared by all of the users because the call server 10 knows the associations between technical number and physical call number of a contact for each user. Thus, when a call is sent by a user destined for a technical number belonging to the owner of the call server 10, the latter processes the call as a function of the number of the user sending the call and is consequently able to find the physical call number corresponding to the contact called by said physical number, in the list of contacts of the user concerned, is the only one to be allocated said technical number.

It should be noted that, to implement this method, the present invention also relates to a dedicated communication infrastructure comprising the call server 10, comprising a database hosting the technical numbers and memorising the lists of contacts of the users as well as the association between each user and his virtual number(s).

The invention claimed is:

1. A method for establishing a telephone connection between a first terminal of a user, said first terminal having a first physical call number, unique, and a second terminal of a contact, said second terminal having a second physical call number, unique, the first terminal being connected to a telecommunication network via an infrastructure of a first operator and the second terminal being connected to said telecommunication network via an infrastructure of a second operator, the infrastructures of the first operator and the second operator being connected to a call server comprising a database comprising a plurality of technical numbers, said method comprising:

the allocation of at least one technical number to the second physical call number through the call server;

the recording in the database of the call server of the association between said second physical call number and said at least one technical number; and when a call or a mini-message is sent to the second terminal destined for a virtual number of the second terminal, from the first terminal, telephonically connecting the first terminal and the second terminal by means of an automatic sending, by the first terminal, of the call or mini-message to the technical number, said call or mini-message being received by the call server, and the transmission of the call or the mini-message, by the call server, to the second physical call number, wherein the at least one technical number is not visible on the first terminal, and wherein the virtual number of the second terminal is different from the second physical call number and the at least one technical number.

2. The method according to claim 1, wherein the technical number allocated to the second physical call number corresponds to a local call number of the country wherein the first terminal is located.

3. The method according to claim 2, wherein a plurality of lists of a plurality of technical numbers corresponding to lists of local numbers for a plurality of respective countries are pre-recorded in a memory of the first terminal.

4. The method according to claim 2, comprising, following a detection, by the call server, of a change of the country wherein the first terminal is located, a downloading of a list of a plurality of local technical numbers of the new country wherein the first terminal is located, and the allocation of a new local technical number to each contact having a second physical call number.

5. The method according to claim 1, comprising the detection by the call server of any change of country wherein the first terminal is located and the allocation of a new local technical number to each contact having a second physical call number in the event of change of country.

6. The method according to claim 1, the first terminal comprising a plurality of contacts associated respectively with a second physical call number, said method comprising the allocation of a technical number to each second physical call number.

7. The method according to claim 1, wherein the call server transmits to the second terminal, corresponding to a destination terminal of the call or mini-message, a virtual number of the first terminal, corresponding to the terminal sending the call or mini-message, as an identification number of the terminal sending the call or the mini-message.

8. The method according to claim 1, wherein the telephone connection comprises the reception of an incoming call or mini-message, destined for the virtual number, by the call server;

the determination, by interrogation of the database of the call server, of the first physical call number corresponding to said virtual number;

the sending, by the call server, of a terminating call or mini-message to said first physical call number; and the end to end connection, by the call server, of the incoming call or mini-message and the terminating call or mini-message to telephonically connect the first terminal and the second terminal.

9. The method according to claim 1, wherein the telephone connection comprises the reception of an outgoing call or mini-message, destined for the technical number, by the call server;

the determination, by interrogation of the database of the call server, of the second physical call number corresponding to said technical number;

the sending, by the call server, of a terminating call or mini-message to said second physical call number; and the end to end connection, by the call server, of the outgoing call or mini-message and the terminating call or mini-message to telephonically connect the first terminal and the second terminal.

\* \* \* \* \*